(12) United States Patent
Zayas

(10) Patent No.: US 11,370,387 B2
(45) Date of Patent: Jun. 28, 2022

(54) EMERGENCY SAFETY SEAT BELT PIN RELEASE DEVICE

(71) Applicant: Ernesto W Zayas, Kokomo, IN (US)

(72) Inventor: Ernesto W Zayas, Kokomo, IN (US)

( * ) Notice: Subject to any disclaimer, the term of this patent is extended or adjusted under 35 U.S.C. 154(b) by 98 days.

(21) Appl. No.: 16/571,656

(22) Filed: Sep. 16, 2019

(65) Prior Publication Data

US 2020/0172045 A1 Jun. 4, 2020

Related U.S. Application Data

(60) Provisional application No. 62/774,903, filed on Dec. 4, 2018.

(51) Int. Cl.
| | | |
|---|---|---|
| *B60R 22/32* | (2006.01) | |
| *B60R 22/30* | (2006.01) | |
| *B60R 22/48* | (2006.01) | |
| *B60R 22/22* | (2006.01) | |

(52) U.S. Cl.
CPC .............. *B60R 22/32* (2013.01); *B60R 22/22* (2013.01); *B60R 22/30* (2013.01); *B60R 22/48* (2013.01); *B60R 2022/4816* (2013.01)

(58) Field of Classification Search
CPC ......... B60R 22/22; B60R 22/30; B60R 22/32; B60R 22/48; B60R 2022/4816
See application file for complete search history.

(56) References Cited

U.S. PATENT DOCUMENTS

| | | | | |
|---|---|---|---|---|
| 2,716,561 | A | * 8/1955 | Beran | .................. B60R 22/201 |
| | | | | 297/468 |
| 2,823,046 | A | * 2/1958 | Banta | ..................... B60R 22/12 |
| | | | | 297/471 |
| 3,126,227 | A | * 3/1964 | Bollinger, Jr. | .......... B60R 22/48 |
| | | | | 180/270 |
| 3,644,967 | A | 2/1972 | Romanzi, Jr. et al. | |
| 3,728,764 | A | 4/1973 | Carter | |
| 4,027,362 | A | * 6/1977 | Hart | .................... A44B 11/2523 |
| | | | | 24/656 |
| 4,322,097 | A | * 3/1982 | Provensal | ............... B60R 22/32 |
| | | | | 280/803 |
| 4,640,550 | A | * 2/1987 | Håkansson | ........... B60R 22/203 |
| | | | | 280/801.2 |
| 5,100,176 | A | 3/1992 | Ball et al. | |
| 5,205,021 | A | * 4/1993 | Durand | .................. A44B 11/12 |
| | | | | 24/163 R |
| D352,591 | S | 11/1994 | Laney | |
| 5,806,148 | A | 9/1998 | McFalls et al. | |
| 5,934,760 | A | * 8/1999 | Schroth | .................. B64D 25/06 |
| | | | | 297/484 |

(Continued)

*Primary Examiner* — Frank B Vanaman
(74) *Attorney, Agent, or Firm* — Ritchison Law Offices, PC; John D Ritchison

(57) ABSTRACT

A Seat Belt Release device for vehicles that is a backup and redundant release. It doubles the chance of release from a seatbelt system in an emergency situation. The release device includes an alert tab on a pull ring that is configured and holds the standard receiver with an extension strap. The receiver engages the tongue of a seat belt and subsequently the electrical switch that deactivates the no-seat-belt warning buzzer. The system provides a secondary backup to the traditional push only release and enables a person in an emergency to pull a pin and quickly release the safety seat belt to allow a driver or passengers to exit the vehicle and save lives.

13 Claims, 7 Drawing Sheets

(56) References Cited

U.S. PATENT DOCUMENTS

| | | | |
|---|---|---|---|
| 6,343,841 B1* | 2/2002 | Gregg | B60R 22/12 |
| | | | 297/464 |
| 6,851,160 B2* | 2/2005 | Carver | A44B 11/04 |
| | | | 24/197 |
| 6,969,122 B2 | 11/2005 | Sachs et al. | |
| 6,986,538 B1* | 1/2006 | Ecker | B25H 3/00 |
| | | | 206/349 |
| 7,373,701 B2 | 5/2008 | Coulombe et al. | |
| 8,572,820 B2 | 11/2013 | Richards | |
| 8,627,554 B1* | 1/2014 | Hagan | A44B 11/2569 |
| | | | 24/630 |
| 9,022,483 B2 | 5/2015 | Merrick | |
| 9,783,157 B2 | 10/2017 | Walker | |
| 2008/0054615 A1* | 3/2008 | Coultrup | B60R 22/32 |
| | | | 280/801.1 |
| 2012/0291239 A1 | 11/2012 | Yamaguchi | |
| 2013/0062925 A1 | 3/2013 | Hori | |
| 2015/0166006 A1 | 6/2015 | Cannady | |

* cited by examiner

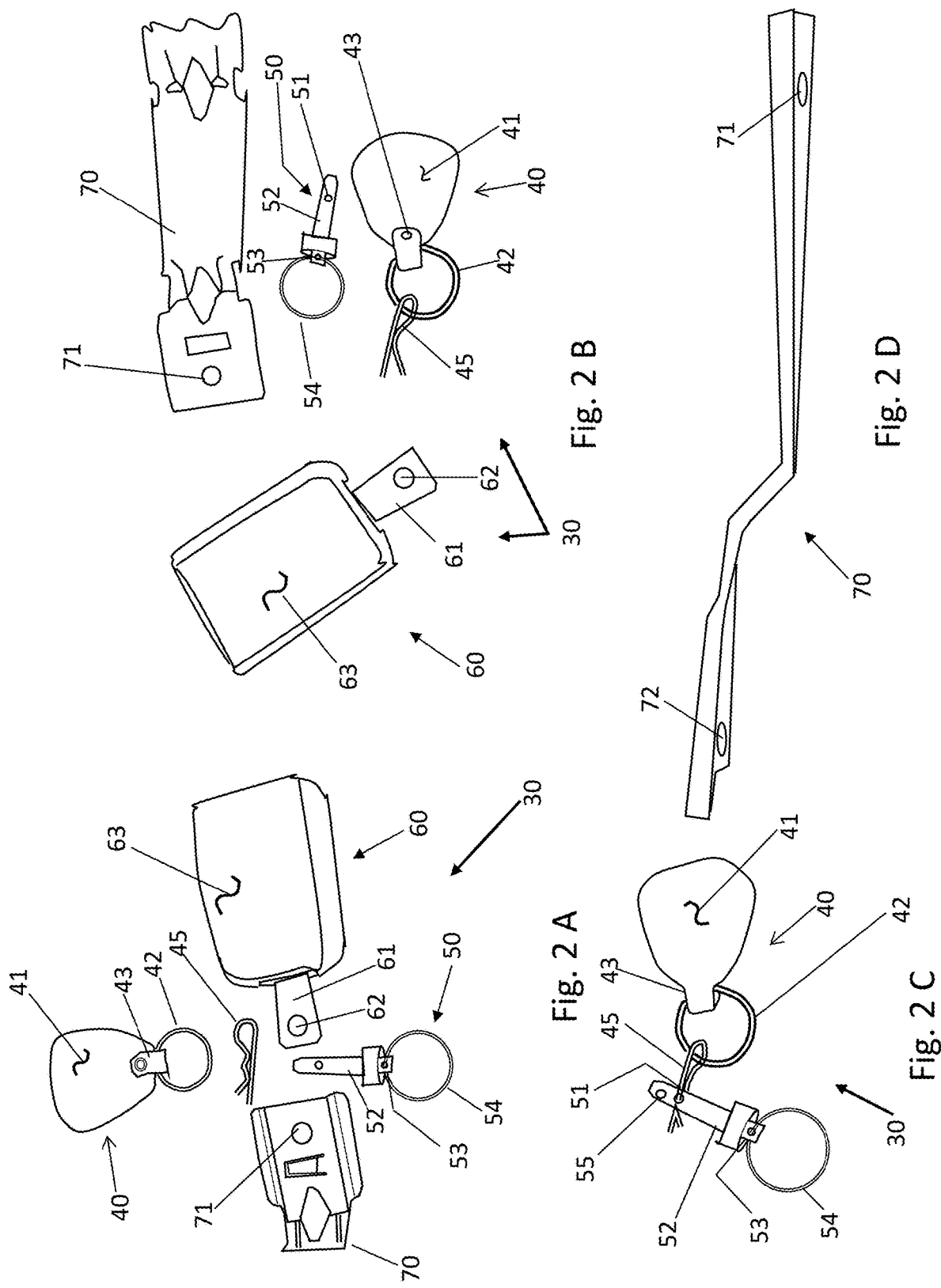

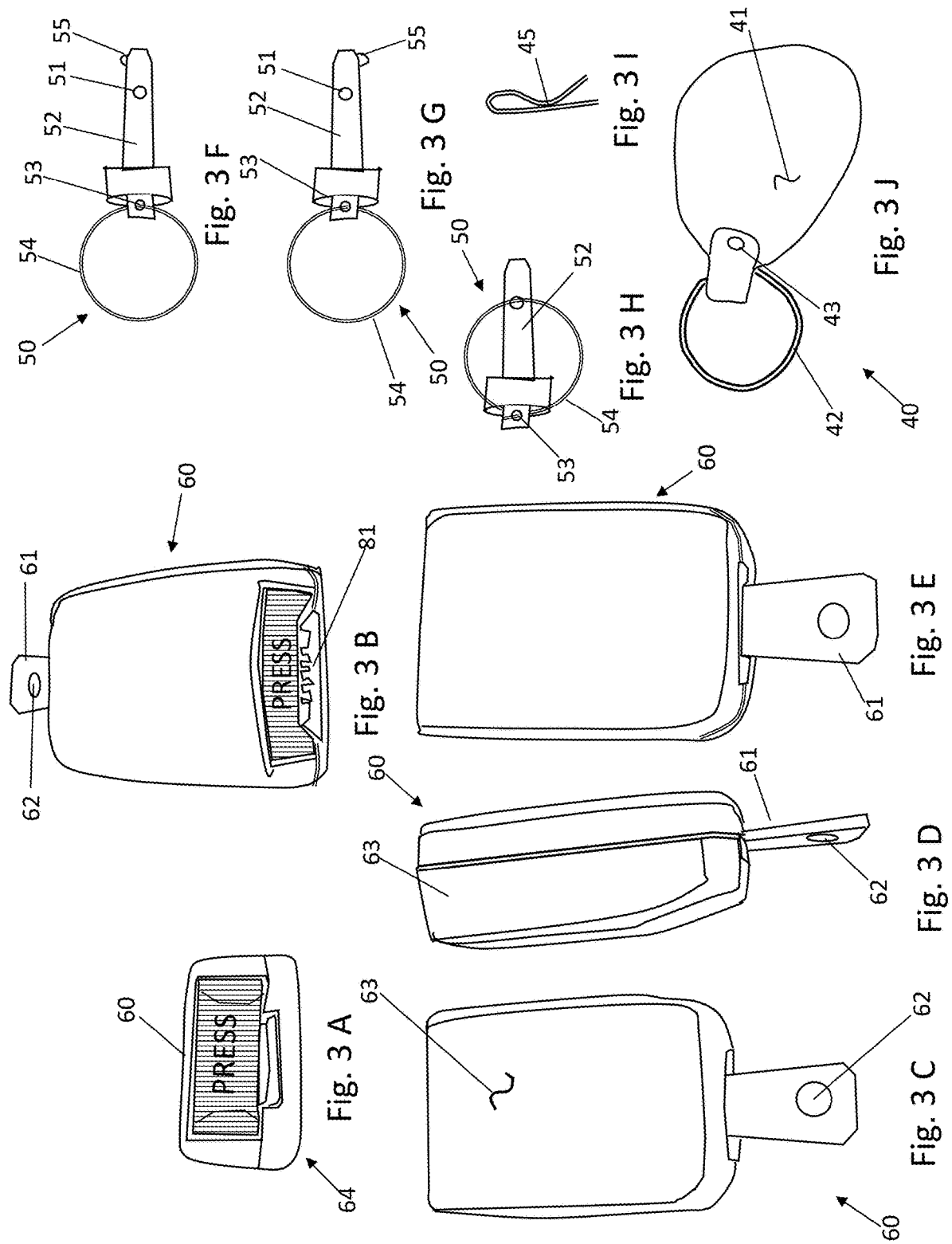

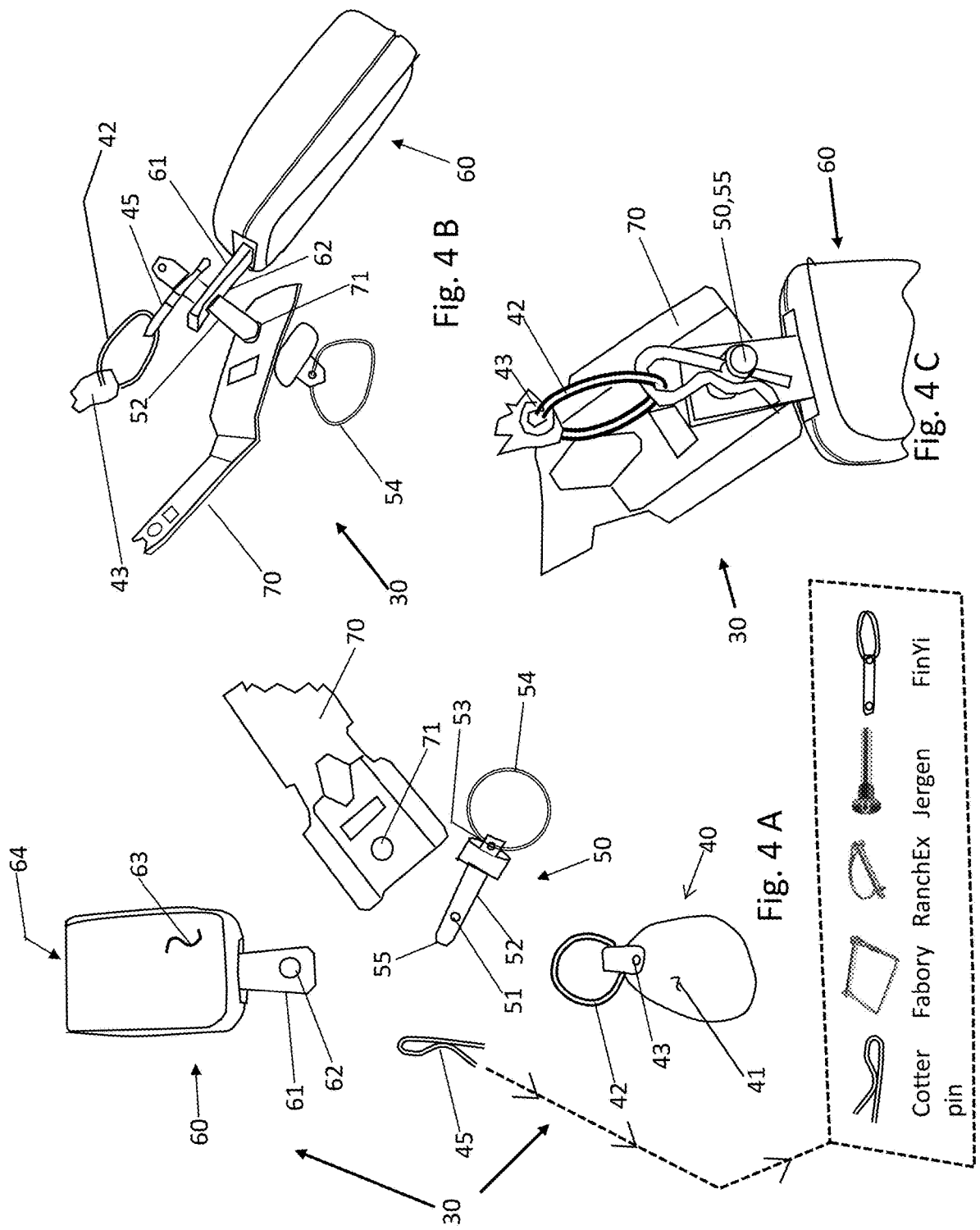

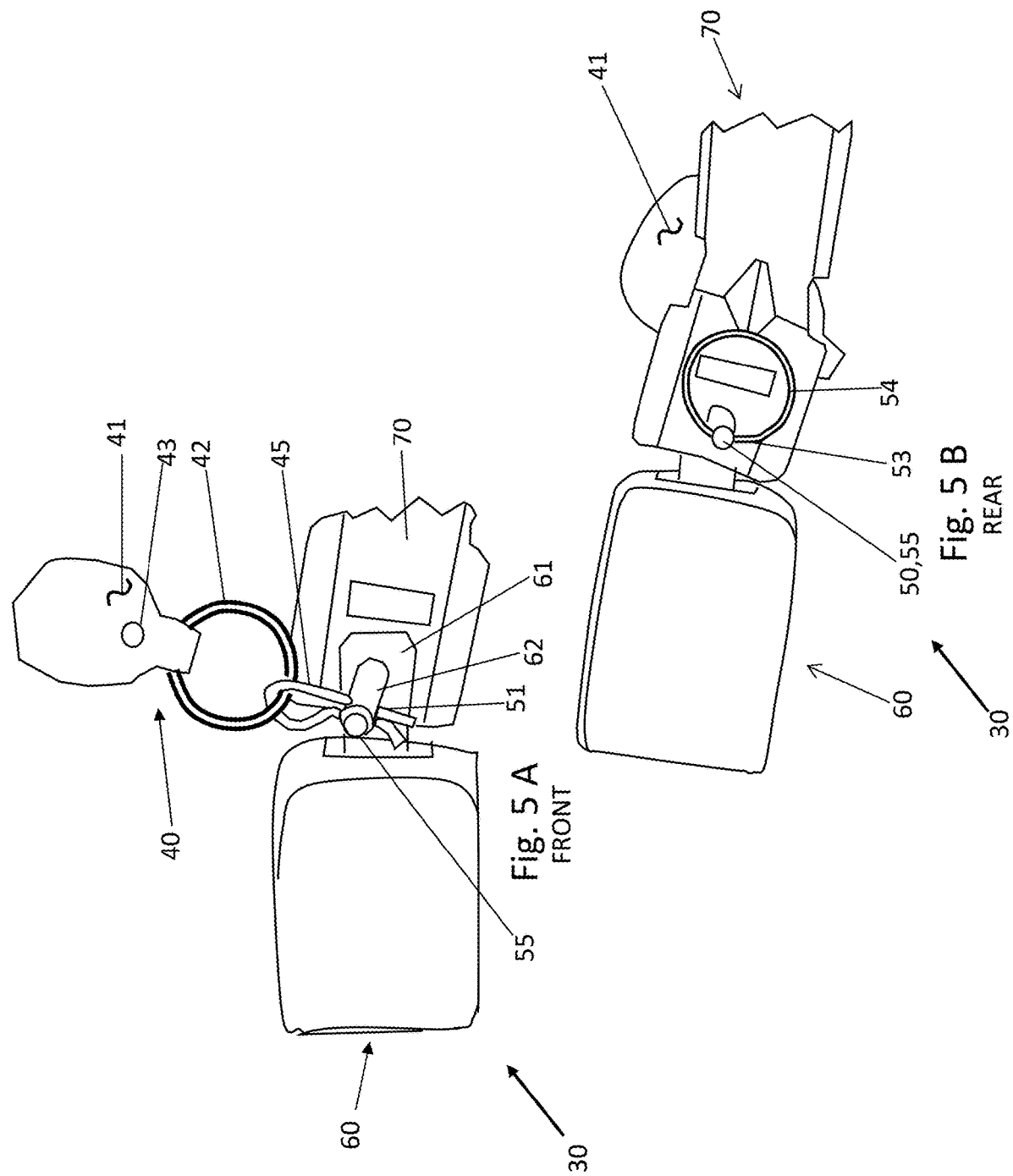

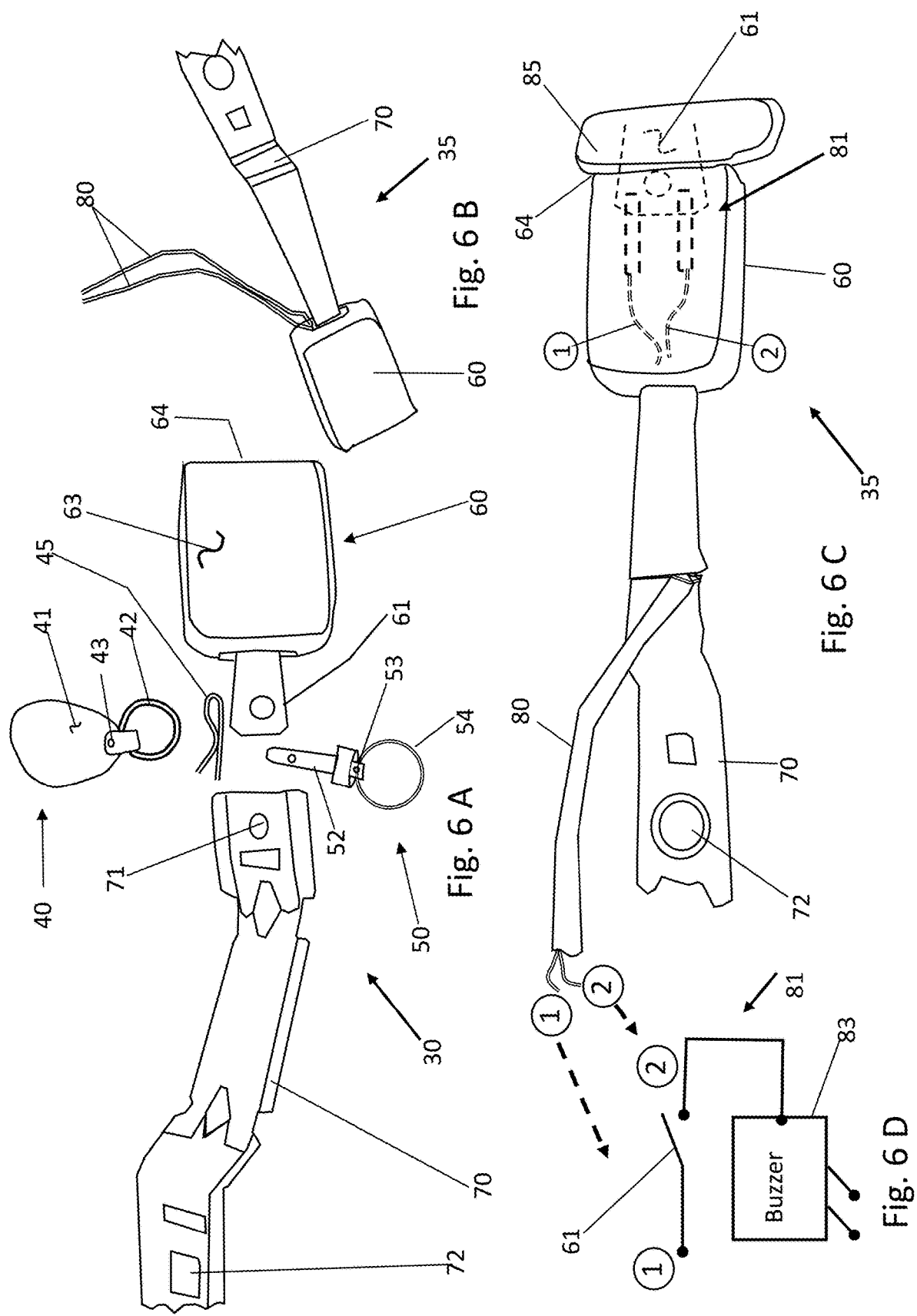

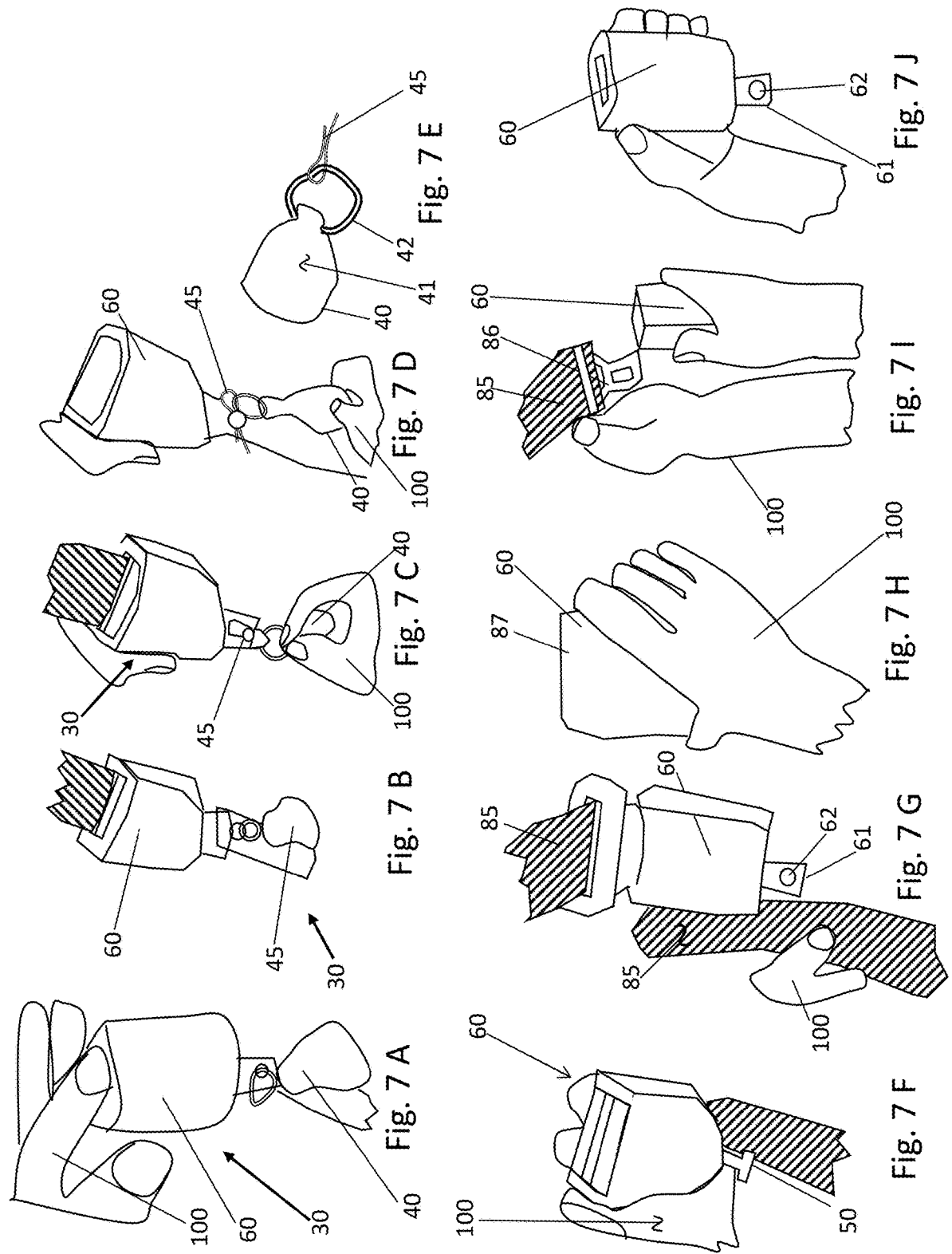

EMERGENCY SAFETY SEAT BELT PIN RELEASE DEVICE

CROSS-REFERENCE TO RELATED APPLICATIONS

This application claims the benefit of U.S. Provisional Patent Application with Ser. No. 62/774,903 filed Dec. 4, 2018, by Ernesto Zayas. The application is entitled "Special EZ Safety Seat Belt Pin Release device".

FIELD OF INVENTION

This invention relates to an Emergency Safety Seat Belt Pin Release device for vehicles and other uses. The device presented is directed generally to a personal restraint systems for use in vehicles and, more particularly, to improvements for seatbelt buckle tongue assemblies. The device is configured to depart from the buckle and bracket and is defined as a second way out of a seatbelt system. The device relates generally to buckles, more specifically to a quick release for a buckle, and, even more particularly, to a quick release buckle used on a safety harness and seatbelt system.

Generally, the improvement is for a belt system and secondary or back-up release for use in a vehicle seat belt system for restraining movement of an occupant of a vehicle. The device represents an improved safety release device having minimal weight, size and cost of manufacture, increased durability, and simplicity of assemblage. It also is a safety seat belt secondary release with lower release effort, with fewer number of component parts, and with improved reliability.

FEDERALLY SPONSORED RESEARCH

None.

SEQUENCE LISTING OR PROGRAM

None.

BACKGROUND-FIELD OF INVENTION AND PRIOR ART

As far as known, there are no Emergency Safety Seat Belt Pin Release devices or the like. It is believed that this product is unique in its design and technologies and that this device will save lives as a second way out of a seatbelt system in the event of an emergency.

Background

This background as to seat belts and release devices should prove to be useful. The use of seat belts in motor vehicles is well known. Seat belts are the number one safety features in vehicles today. Standard seat belts are defined by a strap which extends from a retractor directly to a buckle and a strap which extends from the retractor to the buckle by way of a shoulder sash. In this configuration, the length of the seat belt is structurally limited by the amount of strap which rests outside the retractor, can be stored in the retractor, and can otherwise be manipulated by the retractor. The common or traditional release is a push button buckle with a tongue that slides on the web during routine use. It may also be desirable to lock the buckle tongue on the web during a rough ride, impact or crash to prevent the web from passing through the tongue and loosening. However, the pushbutton component may be difficult to use when defective, especially for small children, elderly persons, and people of large size. In addition, they are known to become defective or stuck. During a vehicular crash especially with the presence of water or fire, panic can set in and further complicate the situation and difficulty to find and use the push button. In addition, the force needed to "push" the button and cause the tongue to release can be a challenge for young children, elderly or weak and feeble persons.

Problem Solved

Obviously, a dual release buckle that can be released either as a typical push button with a redundant pull tab release can provide a significant improvement. The secondary or back-up release can be designed and focused to provide a simple yet easy and quick release that children, elderly or weak persons can actuate. The fasteners such as push buckles can be coupled with a pull tab that can also release the seat belt webbing from the vehicle and free the individual from the restraint. In an emergency situation, it is desirable to be able to release the belt, with one pull on, for example, a pull tab located on the belt near the standard push buckle.

Prior Art

A novelty search revealed that as far as known, there are no Emergency Safety Seat Belt Pin Release devices or the like. It is believed that this product is unique in its design and technologies. A novelty search revealed:

A. U.S. Pat. No. 3,644,967 by Romanzi Jr. et al. issued in 1972 for a SAFETY BELT BUCKLE. This shows a pushbutton-type safety belt buckle having a movable latch member for releasable retention of a tongue connector plate in operable engagement with a catch dog member, and a cam means for relative translatory linear movement of the latch member to enable release of the tongue connector plate from the catch dog member on movement of the pushbutton by depression thereof.

B. U.S. Pat. No. 3,728,764 by Carter issued in 1973 for a DUAL ACTUATION SAFETY BELT BUCKLE MECHANISM. Here is demonstrated a mechanical conversion system that provides push-button actuation of a slide-action locking mechanism, while preserving the possibility of actuation by sliding handle movement where this is desired.

C. U.S. Pat. No. 5,100,176 by Ball et al., issued in 1992 for a Tongue assembly seat belt connection. This provided a tongue assembly for use in a safety apparatus in which belt webbing restrains movement of an occupant of a vehicle includes a base, a cover, and a cam. The cover is mounted for sliding movement on the base and the cover has an actuator portion engageable by the belt webbing to slide the cover along the base between a first portion and a second position. The cover engages and pivots a cam when the cover slides from its first position to its second position and the cam has a clamping surface disposed adjacent a clamping surface on the base. A portion of the belt webbing passes between the clamping surfaces on the base and the cam member. The cam is pivoted by sliding movement of the base into a clamping position in which the cam clamps the belt webbing against the base to block movement of the belt webbing through the tongue assembly.

D. U.S. Pat. No. 5,806,148 by McFalls et al., issued in 1998 for another Tongue assembly seat belt connector and release device. This demonstrates a tongue assembly that includes a metal plate member having a first portion with a buckle latch receiving first opening and a second portion offset from the first portion. The metal plate member has a second opening between the first and second portions through which seat belt webbing extends. The first portion of the metal plate member is positionable on one side of the belt webbing. The second portion of the metal plate member is positionable on the other side of the belt webbing. A seat belt webbing cinch bar is attached to the metal plate member and located on the other side of the belt webbing. The cinch bar has a first position in which the belt webbing is located between the first portion of the metal plate member and the cinch bar. The cinch bar is pivotable to a second position in which the belt webbing partially encircles the cinch bar and is clamped by the cinch bar to block relative movement of the cinch bar and the belt webbing. The cinch bar has a first surface portion which engages the belt webbing and effects pivotal movement of the cinch bar to the second position in response to force applied to the first surface portion by the belt webbing.

E. U.S. Pat. No. 6,969,122 by Sachs et al., issued in 2005 for a Seat belt extender. Here is shown a seat belt extender that is a length of material having limited flexibility, with a male seat belt latch tongue extending from one end and a female seat belt latch receptacle extending from the opposite end. The seat belt extender is installed in an existing, conventional three point seat belt system in a vehicle by inserting the tongue into the receptacle of the short anchor strap generally located at the inboard side of the seat, near the center of the vehicle. The semi-rigid nature of the present extender causes it to remain generally upright when secured to the anchor strap, thus enabling a person having limited upper body mobility to easily access the receptacle end of the extender with the tongue of the existing belt and shoulder strap assembly. The present extender also serves to position the shoulder strap more toward the center of the upper body of an occupant.

F. U.S. Pat. No. 7,373,701 by Coulombe et al., issued in 2008 for a Quick release buckle. Portrayed here is a quick release buckle assembly having a housing, two cams, a knurl bar, and two springs. Each spring is operatively arranged to engage both a respective cam and the knurl bar. The housing includes integral bearing walls for the cams.

G. U.S. Pat. No. 8,572,820 by Richards issued in 2013 for a Dual release buckle. Portrayed is a dual release buckle can be released either as a side-release buckle or as a remotely-released cable actuated buckle and can be incorporated into a garment, for example, a soldier's vest.

H. U.S. Pat. No. 9,022,483 by Merrick issued in 2015 for a Seatbelt buckle tongue assembly and Self-adjusting and/or locking buckle tongue assembly. Demonstrated here is a self-adjusting and/or locking buckle tongue assemblies for use with occupant restraint systems in vehicles are described herein. In one embodiment, a buckle tongue assembly includes a plate having a tongue portion configured to cooperatively engage a corresponding buckle assembly. The buckle tongue assembly of this embodiment can further include first and second web gripping portions carried by the plate. The second web gripping portion is configured to move relative to the first web gripping portion between a first position in which the web gripping portions are spaced apart to permit movement of a web there between, and a second position in which the web gripping portions are engaged or interlocked to clamp the web there between.

I. U.S. Pat. No. 9,783,157 by Walker issued in 2017 for a Seatbelt buckle system. Shown here is a seatbelt buckle system for law enforcement use, wherein the female portion of the buckle is located at the end of a segment which is in a generally upright and readily-accessible position to assure the safe and expeditious restraint of an individual. The individual securing the occupant is advantageously less prone to adverse events such as unwanted contact with or from the occupant, injury to the back or other part of the anatomy, or unwarranted charges of sexual harassment.

J. U.S. Patent Application No. 2012/0291239A1 by Yamaguchi published in 2012 for a seat belt TONGUE. Here is demonstrated a tongue comprises a housing case that is in a substantially box form for housing a tongue plate and inclusive of a through hole formed at a position facing an insertion hole of the tongue plate so as to allow insertion of a webbing, and a stopper bar, with a folded portion of the webbing hung there around, which is arranged striding over the insertion hole of the tongue plate, allowed to slide back and forth with reference to the tongue plate and urged rearward by a urging unit in contact with a pair of front end surfaces on a pair of engagement parts provided at longitudinal ends of the stopper bar. The housing case includes a plurality of ribs arranged upright on an inner surface thereof along a front-rear direction so as to press the webbing which is arranged to face the inner surface and hung around the stopper bar meets. The plurality of ribs are arranged in parallel to one another in a direction orthogonal to a sliding direction of the stopper bar.

K. U.S. Patent Application No. 2013/0062925A1 by Hori was published in 2013 for a TONGUE FOR SEAT BELT DEVICE, AND SEAT BELT DEVICE. This application shows a tongue for a seat belt device that is provided with a tongue main body that is insertable within a buckle, and a train-around portion through which an intermediate portion of a webbing is inserted. The train-around portion includes a first shaft is fixedly mounted between a pair of opposing walls, and a second shaft that is movably mounted between the walls. The webbing is slidably bent 180 degree around the first fixed shaft. When tension of the webbing exceeds a predetermined magnitude or greater, the movable second shaft engages the webbing and increases a bending angle of the webbing around the first shaft to an angle greater than 180 degree thereby increasing frictional resistance between the webbing and the train-around portion.

L. U.S. Patent Application No. 2015/0166006A1 by Cannady published in 2015 for a SEAT BELT EXTENDER. Here is portrayed a seat belt extender that is for allowing a user to increase length of a conventional seat belt assembly. The seat belt extender comprises a strap member with a clasp member at its distal end and a buckle member at its proximal end. The seat belt extender is used in conjunction with conventional seat belt components a conventional seat belt clasp is connected to the buckle member so that it engages and interlocks as when the conventional seat belt clasp interlocks the with conventional seat belt buckle and the clasp member is connected to the conventional seat belt buckle so that it engages and interlocks as when the conventional seat belt clasp interlocks with the conventional seat belt buckle.

M. U.S. Design Patent D352591 by Laney in 1994 for an Extendable auto safety belt accessory. It shows the ornamental design for an extendable auto safety belt accessory, as shown and described. None of these show or anticipate, nor render obvious, the Emergency Safety Seat Belt Pin Release device by Zayas.

SUMMARY OF THE INVENTION

This invention is an Safety Seat Belt Pin Release device. Taught here is a second backup and additional emergency release device for seat belt systems which has never been accomplished before. It doubles the chance of release from a seatbelt system in an emergency situation. In a panic condition, it allows the restrained person to simply pull a tab and release a pin to disconnect and free the driver or passengers from the seatbelt. When a vehicle has caught fire or has plunged into a lake or river, the seconds to exit the vehicle are critical. A missed release or panicking person trying to push a defective release button in the traditional seat belt system can cost valuable seconds. The simple pull tab and instant release offered by the safety release device can save precious seconds and will most importantly save lives.

The preferred embodiment of the a safety seat belt pin release device to be used as a second, back-up assurance with a conventional seat belt. The release is operated conventionally by pulling—not pushing—on a tab that in-turn releases a means for connecting the components of the release device. The release device is made of durable materials and comprised of: (a) an alert tab on pull ring further comprised of a ring on pull ring, and a means for connecting alert tab to ring such as a plastic or metal loop or wire; (b) a fastening means such as a cotter pin, straight pin with a ball detent, split pin, Fabory®, RanchEx®, Jergens®, FinYi® or the like; (c) an elongated member such as a safety rod, pin, or shaft further comprised of an aperture for the cotter pin, a shank or shaft of safety rod, an aperture in shank for a pull ring, the pull ring of safety rod, and an optional tapered end and spring ball on the insert end of the shank; and (d) a standard seat belt receiver further adapted and comprised of an extension strap, an aperture in the extension strap, an encasement of seat belt receiver, and an insert end of receiver that engages tongue of a seat belt and subsequently the electrical switch that deactivates the no-seat-belt warning buzzer wherein the Safety seat belt device is assembled into the seat belt system, including a structural connection strap that secures the system to the vehicle at the floorboard, and replaces the traditional press-type release for the device; wherein the safety seat belt pin release device serves as a redundant and secondary pull release, which is directly connected by the safety pin to the strap at an aperture at seat belt receiver, for the seat belt system; and wherein the safety seat belt pin release device provides a secondary backup to the traditional press only release which enables a person in an emergency situation to pull a rod or pin and quickly and simply releasing the safety seat belt from preventing a driver or passengers from exiting the vehicle. While there needs to be "at least one" release device connecting the safety belt, there may be more than one which are interconnected in a series as two, three, four release devices, and so on. Therefore, one is enough, but multiple release devices can be used.

The newly invented Safety Seat Belt Pin Release device for all vehicles and other uses and applications can be manufactured at low volumes by very simple means and in high volume production by more complex and controlled systems.

OBJECTS AND ADVANTAGES

There are several objects and advantages of the Safety Seat Belt Pin Release device. There are currently no known secondary, back-up or redundant release devices for a seat belt system of restraint in vehicles that are effective at providing the advantages of this invention.

The Safety Seat Belt Pin Release device has various advantages and benefits:

| Item | Advantages |
| --- | --- |
| 1 | Is an easy access - one (1) person can operate. |
| 2 | Requires two (2) simple steps and a person is out of harm's way. |
| 3 | Is very easy for children to know how to operate. |
| 4 | Needs no extra strength to release the belt. |
| 5 | Within seconds and a person is free/and the belt system is disassembled. |
| 6 | Is unlike the normal push system which can be very time consuming in an emergency situation or with a defective push buckle. |
| 7 | Needs no mechanic or tools for unhooking/disassembling. |
| 8 | Has simple instructions. |
| 9 | Has no hazardous materials and uses commonly available parts in a new combination. |
| 10 | Is lightweight. |
| 11 | Can provide a bit more length in the seatbelt system. |
| 12 | Provides two (2) ways out of the belt system at all times. |
| 13 | Is unbreakable metal and won't melt. |
| 14 | Is simple and easy to remove when needed. |
| 15 | Will not confine a person, but allows an opportunity to escape in an emergency. |
| 16 | Will not affect one's mobility or impede ones driving. |
| 17 | For operation, no light is needed. Feel the tab and pull to free oneself of the restraint. |
| 18 | Provides a second chance to avoid being trapped by the belt restraint system in an emergency such as an underwater water or fire emergency. |
| 19 | Is made in the USA. |
| 20 | Lower deaths in car crashes. |
| 21 | Can lower injuries in car crashes. |
| 22 | Requires no energy or electricity to operate. |
| 23 | Is environmentally friendly with no trash or waste involved. |
| 24 | Is a personal protection equipment PPE. |
| 25 | Doubles the chance to get out of the seatbelt restraint in an emergency. |

Finally, other advantages and additional features of the present Safety Seat Belt Pin Release device for various vehicles will be more apparent from the accompanying drawings and from the full description of the device. For one skilled in the art of safety release devices and belt, it is readily understood that the features shown in the examples with this product are readily adapted to other types of safety systems and devices.

DESCRIPTION OF THE DRAWINGS—FIGURES

The accompanying drawings, which are incorporated in and constitute a part of this specification, illustrate an embodiment of the Safety Seat Belt Pin Release device that is preferred. The drawings together with the summary description given above and a detailed description given below serve to explain the principles of the additional device used with a safety seat belt system in vehicles. It is understood, however, that the Safety Seat Belt Pin Release device is not limited to only the precise arrangements and instrumentalities shown.

FIGS. 2A through 2D are sketches of the Safety Seat Belt Pin Release device with components and features noted.

FIGS. 3A through 3J are additional sketches of the various for the Safety Seat Belt Pin Release with the components and features shown from generally a top view.

FIGS. 4A through 4C are drawings of the Safety Seat Belt Pin Release with components shown and assembled.

FIGS. 5A and 5B are front and back close up seat belt pin release device in an assembled position.

FIGS. 6A through 6D are sketches of the Safety Seat Belt Pin Release device with components and original designs shown.

FIGS. 7A through 7J are sketches of the steps in using the Safety seat belt pin release device to quickly free a person from a seat belt.

DESCRIPTION OF THE DRAWINGS—REFERENCE NUMERALS

Figure 1A:
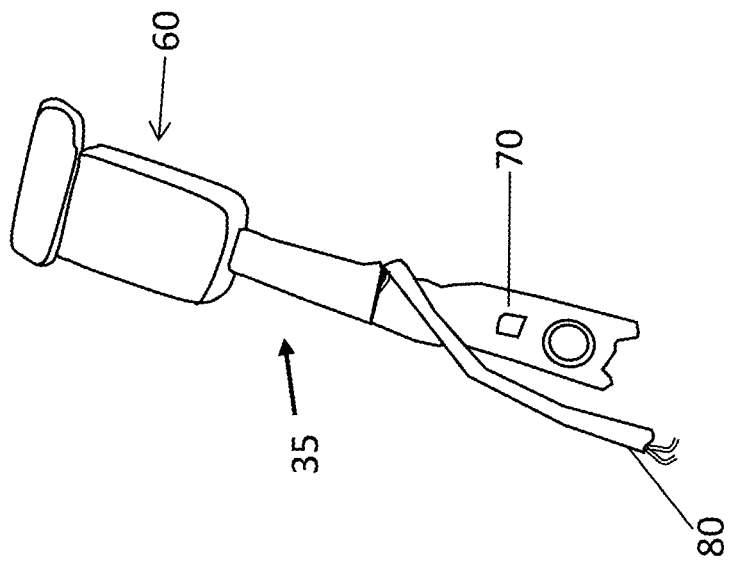
FIGS. 1A through 1C are sketches of the general configurations and parts for the Safety Seat Belt Pin Release.

The following list refers to the drawings:

TABLE B

| Reference numbers | |
|---|---|
| Ref # | Description |
| 30 | EZ safety seat belt pin release device 30 |
| 35 | conventional push button buckle release 35 |
| 40 | pull ring 40 |
| 41 | alert tab 41 on pull ring 40 |
| 42 | ring 42 on pull ring 40 |
| 43 | means 43 for connecting alert tab 41 to ring 42 such as a loop, wire, pin, etc. |
| 45 | a fastening means 45 such as a cotter pin, straight pin with a ball detent, split pin, FaboryRTM, RanchExRTM, JergensRTM, FinYiRTM or the like |
| 50 | safety rod, pin, shaft or equal 50 |
| 51 | aperture 51 for cotter pin 45 |
| 52 | shank or shaft 52 of safety rod 50 |
| 53 | aperture 53 in shank 52 for pull ring 54 |
| 54 | pull ring 54 of safety rod 50 |
| 55 | optional tapered end and spring ball 55 on the insert end of the shank 52 |
| 60 | seat belt receiver 60 |
| 61 | extension strap 61 of seat belt receiver 60 |
| 62 | aperture 62 in strap 61 |
| 63 | encasement 63 of seat belt receiver 60 |
| 64 | insert end 64 of receiver 60 that engages tongue of seat belt 85 |
| 70 | structural connection bracket 70 |
| 71 | aperture (hole) 71 at seat belt receiver 60 |
| 72 | aperture (hole) 72 at floorboard of vehicle |
| 80 | a pair of power conductors (lead 1 and lead 2) or wires 80 to seat belt receiver 60 (for safety buzzer 83) |
| 81 | typical switch 81 of an exisiting seat belt system comprised of electrical wires 80 consisting of lead 1 and lead 2 which engages the extension strap 61 to close the circuit to the buzzer 83 |
| 83 | typical safety buzzer 83 of an existing seat belt system connected to conductor wires 80 |
| 85 | existing safety seat belt system 85 |

TABLE B-continued

| Reference numbers | |
|---|---|
| Ref # | Description |
| 86 | insertion/connection tongue 86 of existing safet seat belt system 85 |
| 100 | operator 100 |

DETAILED DESCRIPTION OF PREFERRED EMBODIMENT

This Emergency Safety Seat Belt Pin Release device for vehicles and other uses is directed generally to personal restraint systems for use in vehicles and, more particularly, to improvements for seatbelt buckle tongue assemblies. The device is configured to depart from the buckle and bracket and is defined as a second way out of a seatbelt system. The device relates generally to buckles, more specifically to a quick release for a buckle, and, even more particularly, to a quick release buckle used on a safety harness and seatbelt system. Generally, the improvement is for a belt system and secondary or back-up release for use in a vehicle seat belt system for restraining movement of an occupant of a vehicle. The device represents an improved safety release device having minimal weight, size and cost of manufacture, increased durability, and simplicity of assemblage. It also is a safety seat belt secondary release with lower release effort, with fewer number of component parts, and with improved reliability.

The advantages for the Emergency Safety Seat Belt Pin Release device 30 are listed above in the introduction. Succinctly the benefits are that the device:

A. Is an easy access—one (1) person can operate.
B. Requires two (2) simple steps and a person is out of harm's way.
C. Is very easy for children to know how to operate.
D. Needs no extra strength to release the belt.
E. Within seconds and a person is free/and the belt system is disassembled.
F. Is unlike the normal push system which can be very time consuming in an emergency situation or with a defective push buckle.
G. Needs no mechanic or tools for unhooking/disassembling.
H. Has simple instructions.
I. Has no hazardous materials and uses commonly available parts in a new combination.
J. Is lightweight.
K. Can provide a bit more length in the seatbelt system.
L. Provides two (2) ways out of the belt system at all times.
M. Is unbreakable metal and won't melt.
N. Is simple and easy to remove when needed.
O. Will not confine a person, but allows an opportunity to escape in an emergency.
P. Will not affect one's mobility or impede ones driving.
Q. For operation, no light is needed. Feel the tab and pull to free oneself of the restraint.
R. Provides a second chance to avoid being trapped by the belt restraint system in an emergency such as an underwater water or fire emergency.
S. Is made in the USA.
T. Lower deaths in car crashes.
U. Can lower injuries in car crashes.
V. Requires no energy or electricity to operate.

W. Is environmentally friendly with no trash or waste involved.

X. Is a personal protection equipment PPE.

Y. Doubles the chance to get out of the seatbelt restraint in an emergency.

The preferred embodiment of the an safety seat belt pin release device 30 to be used as a second, back-up assurance with a conventional seat belt, the release device 30 is made of durable materials and comprised of: (a) an alert tab 41 on pull ring 40 further comprised of a ring 42 on pull ring 40, and a means 43 for connecting alert tab 41 to ring 42 such as a plastic or metal loop or wire; (b) a fastening means 45 such as a cotter pin, straight pin with a ball detent, split pin, Fabory®, RanchEx®, Jergens®, FinYi® or the like; (c) an elongated member such as a safety rod, pin, or shaft 50 further comprised of an aperture 51 for the cotter pin 45, a shank or shaft 52 of safety rod 50, an aperture 53 in shank 52 for a pull ring 54, the pull ring 54 of safety rod 50, and an optional tapered end and spring ball 55 on the insert end of the shank 52; and (d) a standard seat belt receiver 60 further adapted and comprised of an extension strap 61, an aperture 62 in the extension strap 61, an encasement 63 of seat belt receiver 60, and an insert end 64 of receiver 60 that engages insertion/connection 86 of an existing safety seat belt system 85 and subsequently the electrical switch that deactivates the no-seat-belt warning buzzer wherein the Safety seat belt device 30 is assembled into the existing safety seat belt system 85, including a structural connection bracket 70 that secures the system to the vehicle at the floorboard, and replaces the traditional press-type release for the device 30; wherein the safety seat belt pin release device serves as a redundant and secondary pull release, which is directly connected by the safety rod 50 to the bracket 70 at an aperture 71 at seat belt receiver 60, for the seat belt system; and wherein the safety seat belt pin release device provides a secondary backup to the traditional press only release which enables a person in an emergency situation to pull a pin an quickly and simply releasing the safety seat belt from preventing a driver or passengers from exiting the vehicle. The release is operated conventionally by pulling—not pushing—on a tab that in-turn releases a means for connecting the components of the release device. While there needs to be "at least one" release device connecting the safety belt, there may be more than one which are interconnected in a series as two, three, four release devices, and so on. Therefore, one is enough, but multiple release devices can be used.

There is shown in FIGS. 1-7 a complete description and operative embodiment of the Safety Seat Belt Pin Release device 30. In the drawings and illustrations, one notes well that the FIGS. 1-7 demonstrate the general configuration and use of this product. The various example uses are in the operation and use section which follows.

The accompanying drawings, which are incorporated in and constitute a part of this specification, illustrate an embodiment of the Emergency Safety Seat Belt Pin Release device 30 that is preferred. The drawings together with the summary description given above and a detailed description given below serve to explain the principles of the Emergency Safety Release device 30. It is understood, however, that the Emergency device 30 is not limited to only the precise arrangements and instrumentalities shown. Other examples of release devices for seat belts and safety straps and such are still understood by one skilled in the art of safety belt and strap systems and accessory devices to be within the scope and spirit shown here.

Figure 1B:
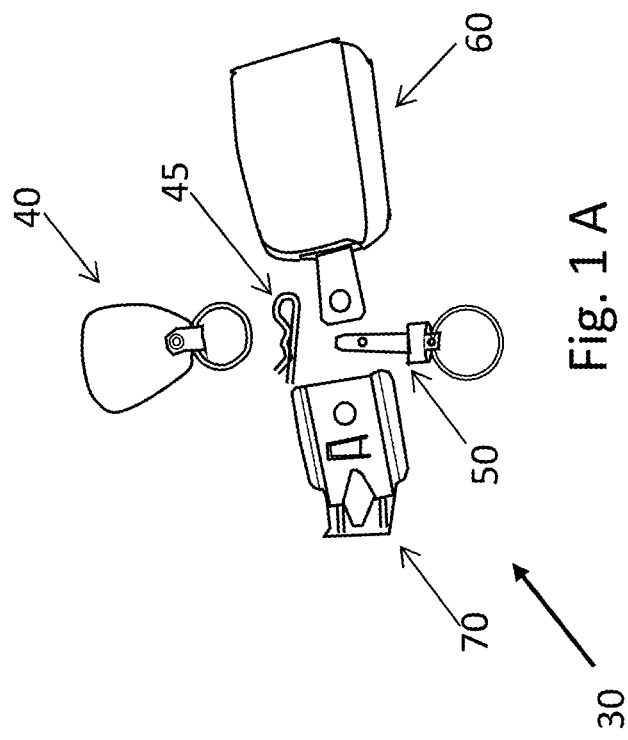
Figure 1C:
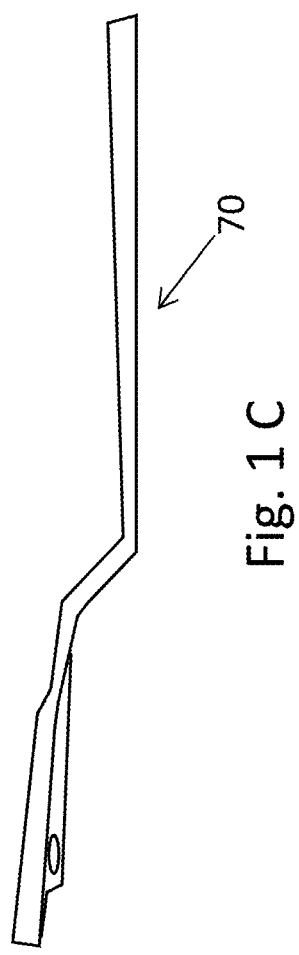

FIGS. 1A through 1C are sketches of the general configurations and parts for the Safety Seat Belt Pin Release device 30. Here are shown: a safety seat belt pin release device 30; a conventional push button buckle release 35; a pull ring 40; a fastening means 45 such as a cotter pin, straight pin with a ball detent, split pin, Fabory®, RanchEx®, Jergens®, FinYi® or the like; a safety rod, pin, shaft or equal 50; a seat belt receiver 60; a structural connection bracket 70; and a pair of power conductors or wires 80 to seat belt receiver 60 (for safety buzzer).

FIGS. 2A through 2D are sketches of the Safety Seat Belt Pin Release device with components and features noted. These sketches provide the following: an safety seat belt pin release device 30; a pull ring 40; an alert tab 41 on pull ring 40; a ring 42 on pull ring 40; a means 43 for connecting alert tab 41 to ring 42 such as a loop, wire, pin, etc.; a fastening means 45 such as a cotter pin, straight pin with a ball detent, split pin, Fabory®, RanchEx®, Jergens®, FinYi® or the like; a safety rod, pin, shaft or equal 50; an aperture 51 for cotter pin 45; a shank or shaft 52 of safety rod 50; an aperture 53 in shank 52 for pull ring 54; pull ring 54 of safety rod 50; an optional tapered end and spring ball 55 on the insert end of the shank 52; a seat belt receiver 60; an extension strap 61 of seat belt receiver 60; an aperture 62 in strap 61; an encasement 63 of seat belt receiver 60; a structural connection bracket 70; an aperture (hole) 71 at seat belt receiver 60; and an aperture (hole) 72 at floorboard of vehicle.

FIGS. 3A through 3J are additional sketches of the various for the Safety Seat Belt Pin Release with the components and features shown from generally a top view. These sketches demonstrate the components and features as follows: a pull ring 40; an alert tab 41 on pull ring 40; a ring 42 on pull ring 40; a means 43 for connecting alert tab 41 to ring 42 such as a loop, wire, pin, etc.; a fastening means 45 such as a cotter pin, straight pin with a ball detent, split pin, Fabory®, RanchEx®, Jergens®, FinYi® or the like; a safety rod, pin, shaft or equal 50; an aperture 51 for cotter pin 45; a shank or shaft 52 of safety rod 50; an aperture 53 in shank 52 for pull ring 54; pull ring 54 of safety rod 50; an optional tapered end and spring ball 55 on the insert end of the shank 52; a seat belt receiver 60; an extension strap 61 of seat belt receiver 60; an aperture 62 in strap 61; an encasement 63 of seat belt receiver 60; and an insert end 64 of receiver 60 that engages insertion/connection 86 of an existing seat belt system 85.

FIGS. 4A through 4C are drawings of the Safety Seat Belt Pin Release with components shown and assembled. Once again the features and components here show the following: the various components of a safety seat belt pin release device 30; an alert tab 41 on pull ring 40; a ring 42 on pull ring 40; a means 43 for connecting alert tab 41 to ring 42 such as a loop, wire, pin, etc.; a fastening means 45 such as a cotter pin, straight pin with a ball detent, split pin, Fabory®, RanchEx®, Jergens®, FinYi® or the like; a safety rod, pin, shaft or equal 50; an aperture 51 for cotter pin 45; a shank or shaft 52 of safety rod 50; an aperture 53 in shank 52 for pull ring 54; pull ring 54 of safety rod 50; an optional tapered end and spring ball 55 on the insert end of the shank 52; a seat belt receiver 60; an extension strap 61 of seat belt receiver 60; an aperture 62 in strap 61; an encasement 63 of seat belt receiver 60; an insert end 64 of receiver 60 that engages insertion/connection 86 of existing safety seat belt system 85; a structural connection bracket 70; and an aperture (hole) 71 at seat belt receiver 60. The durable materials anticipated are metals such as steel, steel alloy, aluminum, brass, and tungsten; plastics such as such as urethane, polyurethane Polyethylene Terephthalate (PETE or PET or PETG), High-Density Polyethelene (HDPE), Polyvinyl Chloride (PVC), Low-Density Polyethylene (LDPE), Polypropylene (PP), and Acrylonitrile butadiene styrene (ABS); and composite materials. One understands that the release is operated conventionally by pulling—not pushing—on a tab that in-turn releases a means for connecting the components of the release device. While there needs to be "at least one" release device connecting the safety belt, there may be more than one which are interconnected in a series as two, three, four release devices, and so on. Therefore, one is enough, but multiple release devices can be used.

FIGS. 5A and 5B are front and back close up seat belt pin release device in an assembled position. The assemblies demonstrate: a safety seat belt pin release device 30; a pull ring 40; an alert tab 41 on pull ring 40; a ring 42 on pull ring 40; a means 43 for connecting alert tab 41 to ring 42 such as a loop, wire, pin, etc.; a fastening means 45 such as a cotter pin, straight pin with a ball detent, split pin, Fabory®, RanchEx®, Jergens®, FinYi® or the like; a safety rod, pin, shaft or equal 50; an aperture 51 for cotter pin 45; a shank or shaft 52 of safety rod 50; an aperture 53 in shank 52 for pull ring 54; pull ring 54 of safety rod 50; an optional tapered end and spring ball 55 on the insert end of the shank 52; a seat belt receiver 60; and a structural connection bracket 70.

FIGS. 6A through 6D are sketches of the Safety Seat Belt Pin Release device with components and original designs shown. Here are displayed: a safety seat belt pin release device 30; conventional push button buckle release 35; a pull ring 40; an alert tab 41 on pull ring 40; a ring 42 on pull ring 40; a means 43 for connecting alert tab 41 to ring 42 such as a loop, wire, pin, etc.; a cotter pin 45 or equal fastening means; a safety rod, pin, shaft or equal 50; a shank or shaft 52 of safety rod 50; an aperture 53 in shank 52 for pull ring 54; pull ring 54 of safety rod 50; a seat belt receiver 60; an encasement 63 of seat belt receiver 60; an insert end 64 of receiver 60 that engages insertion/connection 86 of existing safety seat belt system 85; a structural connection bracket 70; an aperture (hole) 71 at seat belt receiver 60; an aperture (hole) 72 at floorboard of vehicle; a pair of power conductors (lead 1 and lead 2) or wires 80 to seat belt receiver 60 (for safety buzzer); a typical switch 81 of an existing seat belt system comprised of electrical wires 80 consisting of lead 1 and lead 2 which engages the extension strap 61 to close the circuit to the buzzer 83; and a typical safety buzzer 83 of an existing seat belt system connected to conductor wires 80. Of note, the materials to produce and manufacture the components of an Emergency Safety Seat Belt Pin Release device 30 include and anticipate metals such as steel, steel alloys, aluminum, tungsten and the like; composite materials such as plastics, reinforced plastics and various strong and lightweight space age composites.

FIGS. 7A through 7J are sketches of the steps in using the Safety seat belt pin release device 30 to quickly free a person from a seat belt. These steps are explained in the Operation paragraphs which follow this section.

The details mentioned here are exemplary and not limiting. Other specific components and manners related in describing an Emergency Safety Seat Belt Pin Release device 30 can be added by a person having ordinary skill in the field of the art of safety belt systems or releasable connection mechanisms for belts and straps. These additions to similar devices will be appreciated and understood by those skilled in those like devices and systems.

OPERATION OF THE PREFERRED EMBODIMENT

The Emergency Safety Seat Belt Pin Release device 30 has been described in the above embodiment. The manner of how the device 30 operates is described below. One notes well that the description above and the operation described here must be taken together to fully illustrate the concept of the Emergency Safety Seat Belt Pin Release device 30. The preferred embodiment of the a safety seat belt pin release device 30 to be used as a second, back-up assurance with a conventional seat belt, the release device 30 is made of durable materials and comprised of: (a) an alert tab 41 on pull ring 40 further comprised of a ring 42 on pull ring 40, and a means 43 for connecting alert tab 41 to ring 42 such as a plastic or metal loop or wire; (b) a fastening means 45 such as a cotter pin, straight pin with a ball detent, split pin, Fabory®, RanchEx®, Jergens®, FinYi® or the like; (c) an elongated member such as a safety rod, pin, or shaft 50 further comprised of an aperture 51 for the cotter pin 45, a shank or shaft 52 of safety rod 50, an aperture 53 in shank 52 for a pull ring 54, the pull ring 54 of safety rod 50, and an optional tapered end and spring ball 55 on the insert end of the shank 52; and (d) a standard seat belt receiver 60 further adapted and comprised of an extension strap 61, an aperture 62 in the extension strap 61, an encasement 63 of seat belt receiver 60, and an insert end 64 of receiver 60 that engages insertion/connection 86 of an existing safety seat belt system 85 and subsequently the electrical switch that deactivates the no-seat-belt warning buzzer wherein the Safety seat belt device 30 is assembled into the existing safety seat belt system 85, including a structural connection bracket 70 that secures the system to the vehicle at the floorboard, and replaces the traditional press-type release for the device 30; wherein the safety seat belt pin release device serves as a redundant and secondary pull release, which is directly connected by the safety rod 50 to the bracket 70 at an aperture 71 at seat belt receiver 60, for the seat belt system; and wherein the safety seat belt pin release device provides a secondary backup to the traditional press only release which enables a person in an emergency situation to pull a pin an quickly and simply releasing the safety seat belt from preventing a driver or passengers from exiting the vehicle.

The Emergency Safety Seat Belt Pin Release device 30 operates simply by a person 100 pulling out the alert tab 41 of the safety seat belt pin release device 30 and thereby pulling the cotter pin 45 or equal fastening means out of the aperture 51 of the safety rod, pin, shaft or equal 50. That allows the operator 100 to then use the pull ring 54 and disengage the shank or shaft 52 of safety rod 50 out of the aperture (hole) 71 at seat belt receiver 60. This thereby frees the seat belt receiver 60 and existing safety seat belt system 85 from the vehicle.

FIGS. 7A through 7J are sketches of the steps in using the Safety seat belt pin release device 30 to quickly free a person 100 from an existing safety seat belt system 85 in a vehicle. The process steps are:

Step 1—FIG. 7A—Operator 100 pulls the pull ring 40 by pulling the alert tab 41.

Step 2—FIG. 7B—the operator 100 tugs on the ring 42 of the pull ring 40 tugs on the cotter pin 45.

Step 3—FIG. 7C—the operator 100 continues to tug and the cotter pin 45 disengages from the aperture 51 in the shank 52 of the safety rod 50.

Step 4—FIG. 7D—the cotter pin 45 is attached to the pull ring 40 and is free of the device 30.

Step 5—FIG. 7E—the cotter pin 45 and pull ring 40 is tossed aside.

Step 6—FIG. 7F—operator 100 pulls on safety rod 50

Step 7—FIG. 7G—safety rod disengages the hole 62 in the strap 61 of the seat belt receiver 60 as well as disengages the hole 71 of the connection bracket 70. The bracket 70 is connected to the vehicle.

Step 8—FIG. 7H—operator 100 has receiver 60 and seat belt 85 now free and totally disengaged from the vehicle.

Step 9—FIG. 7I—Operator 100 pulls receiver 60 and existing safety seat belt off their shoulder and are thereby unrestrained.

Step 10—FIG. 7J—operator holds receiver 60 free and clear. In returning the seatbelt to working condition, the steps are essentially reversed and one pays special attention to reconnect the pair of power conductors or wires 80 to seat belt receiver 60 (for safety buzzer). This once again puts the seat belt system into full working order.

Many uses are anticipated for the Emergency Safety Seat Belt Pin Release device 30. Some examples, and not limitations, are shown in the following Table.

| Item | USES |
| --- | --- |
| 1 | Forklift - warehouse mobile |
| 2 | Roller coaster ride - amusement park ride |
| 3 | Lawn equipment - outdoor equipment |
| 4 | Cars/trucks/van = vehicles |
| 5 | Tractor trailers = commercial vehicles |
| 6 | Construction equipment |
| 7 | Nascar race cars |
| 8 | Gokart and recreational vehicles |
| 9 | School busses/greyhound/commercial busses |
| 10 | Trains/boats/rockets |
| 11 | Fire trucks/ambulances |
| 12 | Dolly genie high rise lifts and other construction building equipment |
| 13 | Sling shot motorcycles and three (3) wheel vehicles |
| 14 | Helicopter/airplane safety restraints |
| 15 | Jet skis/snowmobiles |
| 16 | As a new way at saving lives and keeping families safe and together for now and for in the future |

With this description it is to be understood that the Emergency Safety Seat Belt Pin Release device 30 is not to be limited to only the disclosed embodiment of product. The features of the device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred and alternative methods and materials are now described above in the foregoing paragraphs.

Other embodiments of the invention are possible. Although the description above contains much specificity, these should not be construed as limiting the scope of the invention, but as merely providing illustrations of some of the presently preferred and alternative embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail the figures and the foregoing description, the same is to be considered as illustrative and not restrictive in character, it being understood that only selected embodiments have been shown and described and that all changes, modifications and equiva-

What is claimed is:

1. At least one safety seat belt pin release device (30) to be used with a vehicle as a second, back-up assurance with a push button buckle release (35) of an existing seat belt system (85), the release device (30) is made of a durable material and comprised of:
   (a) a pull ring (40) comprised of an alert tab (41), a ring (42), and a means (43) for connecting the alert tab (41) to the ring (42);
   (b) a fastening means (45);
   (c) a safety rod (50) comprised of a shank (52) with a first aperture (51) at one end for accepting the fastening means (45) and with a second aperture (53) at an opposite end for accepting a further pull ring (54) of the safety rod (50); and
   (d) a seat belt receiver (60) with an electrical switch that deactivates a no-seat-belt warning buzzer wherein the safety seat belt pin release device (30) is assembled into the existing seat belt system (85), including a structural connection bracket (70) that secures the push button buckle release (35) to the vehicle at a floorboard, and supplements the existing push button buckle release (35) with the device (30); wherein the safety seat belt pin release device (30) serves as a redundant and secondary pull release, which is directly connected by the safety rod (50) to the structural connection bracket (70) at an aperture (71) of the seat belt receiver (60), for the push button buckle release (35); and wherein the safety seat belt pin release device (30) enables a person in an emergency situation to pull the fastening means (45) and to quickly and simply release the safety seat belt pin release device (30) allowing a driver and/or passengers to exit the vehicle.

2. The at least one safety seat belt pin release device (30) in claim 1 wherein the durable material is selected from the group consisting of metals, plastics, and composite materials.

3. The at least one safety seat belt pin release device (30) in claim 2 wherein the metal is selected from the group consisting of steel, steel alloy, aluminum, brass, and tungsten.

4. The at least one safety seat belt pin release device (30) in claim 2 wherein the plastic is selected from the group consisting of urethane, polyurethane Polyethylene Terephthalate, High-Density Polyethylene, Polyvinyl Chloride, Low-Density Polyethylene, Polypropylene, and Acrylonitrile butadiene styrene.

5. The at least one safety seat belt pin release device (30) in claim 1 wherein the fastening means (45) is selected from the group consisting of a cotter pin, a straight pin with a ball detent, and a split pin.

6. The at least one safety seat belt pin release device (30) in claim 1 wherein the safety rod (50) is selected from the group consisting of a rod, a pin, and a shaft.

7. The at least one safety seat belt pin release device (30) in claim 6 wherein the safety rod (50) is further comprised of a tapered end and a spring ball (55) on an insert end of the shank (52).

8. The at least one safety seat belt pin release device (30) in claim 1 wherein the seat belt receiver (60) is further adapted and comprised of an extension strap (61), an aperture (62) in the extension strap (61), an encasement (63), and an insert end (64) of the seat belt receiver (60) that engages a tongue of the existing seat belt system (85).

9. The at least one safety seat belt pin release device (30) in claim 1 wherein there is more than one safety seat belt pin release device (30) placed in a series connection with at least one further safety seat belt pin release device (30).

10. The at least one safety seat belt pin release device (30) in claim 1 wherein the vehicle is selected from the group consisting of a car, a truck, a forklift, a set of lawn equipment, a van, a tractor for a trailer, a set of construction equipment, a race car, a go-kart, a school bus, a commercial bus, a train, a boat, a recreational vehicle, a fire truck, an ambulance, a sling shot motor cycle, a 3 wheeled vehicle, a helicopter, an airplane, a jet ski, and a snowmobile.

11. At least one safety seat belt pin release device (30) to be used with a vehicle as a second, back-up and supplemental assurance with an existing seat belt system (85), the release device (30) is made of a durable material and comprised of:
   (a) a pull ring (40) comprised of an alert tab (41), a ring (42) and a plastic loop (43) integral with the alert tab (41) and encircling the ring (42);
   (b) a cotter pin (45);
   (c) a safety rod (50) comprised of a shank (52) with a first aperture (51) at one end for accepting the cotter pin (45) and with a second aperture (53) at an opposite end for accepting a further pull ring (54) of the safety rod (50), and a tapered end and a spring ball (55) on an insert end of the shank (52); and
   (d) a seat belt receiver (60) further adapted and comprised of an extension strap (61), an aperture (62) in the extension strap (61), an encasement (63), and an insert end (64) of the seat belt receiver (60) that engages a tongue of a push button buckle release (35) of the existing seat belt system (85) with an electrical switch that deactivates a no-seat-belt warning buzzer in the existing seat belt system (85), wherein the Safety seat belt device (30) is assembled into the existing seat belt system (85), including a structural connection bracket (70) that secures the push button buckle release (35) to the vehicle at a floorboard, and supplements the push button buckle release (35) with the device (30); wherein the safety seat belt pin release device (30) serves as a redundant and secondary pull release, which is directly connected by the safety rod (50) to the structural connection bracket (70) at an aperture (71) at seat belt receiver (60), for the push button buckle release; and wherein the safety seat belt pin release device (30) enables a person in an emergency situation to pull the cotter pin (45) and to quickly and simply release the existing seat belt system (85) from preventing a driver or passengers from exiting the vehicle.

12. The at least one safety seat belt pin release device (30) in claim 11 wherein there is a first safety seat belt pin release device (30) placed in a series connection with a second safety seat belt pin release device (30).

13. The at least one safety seat belt pin release device (30) in claim 11 wherein the vehicle is selected from the group consisting of a car, a truck, a forklift, a set of lawn equipment, a van, a tractor for a trailer, a set of construction equipment, a race car, a go-kart, a school bus, a commercial bus, a train, a boat, a recreational vehicle, a fire truck, an ambulance, a sling shot motor cycle, a 3 wheeled vehicle, a helicopter, an airplane, a jet ski, and a snowmobile.

* * * * *